United States Patent [19]

Novak et al.

[11] 3,891,780
[45] June 24, 1975

[54] CRUSTACEAN WASTE WATER PRODUCT RECOVERY PROCESS

[76] Inventors: Leo J. Novak, 2941 S. Dayton-Lakeview Rd., New Carlisle, Ohio 45344; William A. Myers, III, 4950 Feliciana Dr., New Orleans, La. 70126

[22] Filed: Apr. 13, 1973

[21] Appl. No.: 350,921

[52] U.S. Cl. .............................. 426/657; 426/495
[51] Int. Cl. ................................................ A23b /10
[58] Field of Search ............ 260/112; 426/402, 479, 426/490, 495, 316, 321, 74, 364, 376, 397, 805, 478, 489; 210/23

[56] References Cited
UNITED STATES PATENTS

| | | | |
|---|---|---|---|
| 2,560,011 | 7/1951 | Trudel | 260/112 |
| 2,670,295 | 3/1954 | Ash | 426/316 |
| 2,851,356 | 9/1958 | Bedford | 426/321 |
| 3,148,141 | 7/1961 | Schonenberger | 210/23 |
| 3,228,876 | 1/1966 | Mahon | 210/22 |
| 3,390,909 | 7/1968 | Jantzen | 260/112 |
| 3,598,606 | 8/1971 | Spinelli | 260/112 |
| 3,707,381 | 12/1972 | Sharp | 260/112 |

FOREIGN PATENTS OR APPLICATIONS

| | | | |
|---|---|---|---|
| 1,202,254 | 8/1970 | United Kingdom | 260/112 |
| 45-8620 | 3/1970 | Japan | 260/112 |

*Primary Examiner*—Samih N. Zaharna
*Assistant Examiner*—Ernest G. Therkorn

[57] ABSTRACT

Large amounts of water are used during crustacean peeling and canning processes. Such waste processing water creates a serious pollution problem, yet it contains valuable nutritional non-volatile components. These components are of two types, one is typically protein in nature, precipitable at a particular pH between 4–5, while the other set of components remain soluble at such pH's and are regarded as lower molecular weight nitrogenous proteinaceous components resembling peptones or polypeptides formed either by hydrolytic processes or existing as such in the crustacea. Both the acid precipitable protein and the non-acid precipitable proteinaceous components are extracted by the processing water used during removal of the crustacean exoskeleton (hull or shell) in the peeling operations.

7 Claims, No Drawings

CRUSTACEAN WASTE WATER PRODUCT RECOVERY PROCESS

This disclosure describes a crustacean canning process which comprises peeling of the shellfish for hull or shell removal, recycling of the water used for such exoskeletal removal to build up the soluble components content therein, sieving to remove gross insoluble crustacean tissue and exoskeletal pieces after each processing water recycling, acidifying the recycled waste processing water to precipitate the protein components therein, recovering these protein components by centrifugation, subjecting the supernatant from acid precipitation to vacuum rotary precoat filtration, if necessary, then using reverse osmosis (R.O.) or ultrafiltration (U.F.) to give a concentrate of the soluble components not precipitable by acid from such supernatants.

Water consumption is very large in crustacean canning processes. For example, in shrimp canneries the quantity of water used ranges from 100 to 1,000 gallons per minute or 6,000 to 60,000 gallons per hour (G.P.H.). Fresh water is utilized to assist in removing the exoskeletal material (shells or hulls) during the peeling operations. The resultant waste water, which has a high 5-day B.O.D., creates a serious problem for the canner. On the average the water, after removal of the hulls, etc., generally contains only about 0.2% by weight total non-volatile solids. At such low solid concentrations, it makes the recovery therefrom of valuable products difficult and not economically feasible and typical waste recovery processes are not applicable.

It is, accordingly, a principal object of this invention to provide an efficient process for treating crustacean cannery waste water to recover valuable products therefrom.

Another object of the invention is to provide a process for treating fish or crustacean cannery waste water to recover proteinaceous products wherein recycling of the waste water is utilized to build up or concentrate the soluble solids therein whereby recovery of such proteinaceous components of the waste water is rendered more efficient.

A still further object of the invention is to process fish or crustacean cannery waste water to recover valuable products therefrom which includes removal of insoluble crustacea or pieces of same, then treatment and recycling of the waste water through the cannery a number of times to increase the solids content and improve the efficiency of the waste water treating process.

These and other objects and advantages of the invention will become apparent as the description thereof proceeds hereinafter.

The invention will be described hereinafter with particular reference to the shrimp canning industry but the process is likewise applicable for the treatment of waste water produced during processing of other crustacean seafood, such as crab, as described hereinafter, lobster and the like shellfish to extract shell-free meat and other valuables therefrom.

Shrimp canning, for example, comprises a mechanical peeling operation in which the shrimp is subjected to linear and lateral squeezing by rubber rollers with water jets impinging thereon to remove the shells or hulls portions from the seafood. During this peeling operation a large quantity of fresh water is used. This resultant shrimp waste water contains soluble components as well as some water insoluble shrimp tissues. The waste water creates a disposal problem for the canner, however, because of the low solids concentration in the waste water, averaging only about 0.2% total non-volatile solids, as hereinbefore pointed out, it makes the recovery of valuable products therefrom difficult.

To improve the canning operation and to provide a more efficient waste solids recovery process, the waste water after sieving to remove gross insoluble tissue pieces and exoskeletal particles is preferably recycled through the cannery 1 or more times, usually 4 to 5 times, before being drawn off or collected for treatment to recover the valuable constituents. By recycling the crustacean cannery waste water, there is less equipment and size needed which lowers the cost, and the volume of waste water to be processed is less. Moreover, the soluble solids content of the waste water can be substantially increased, for example, from less than 0.15% to 3% or more as desired depending upon the number of times the waste water is recycled through the cannery. The number of recycles utilized will depend on the solubility limits of the soluble proteinaceous and non-proteinaceous components of the shellfish waste water and the bacterial count which must be kept as low as possible. Where pure well or drinking water is used initially in the cannery, there is no significant increase in bacterial count from such recycling since such water is moving rapidly through the cannery and during the peeling (de-hulling) operation there is plenty of aeration of the waste water which inhibits bacterial proliferation.

The influence of recycling waste water in shrimp canning to build up the soluble solids prior to precipitation and recovery of the valuable components is exemplified in the following Table I.

Cannery recycled or non-recycled waste water used in the hull peeling, washing and rinsing operation is acidified with the addition of mineral acid, e.g. muriatic, to precipitate the water soluble protein solids. Recovery of such precipitated solids components of the waste water is achieved

TABLE I

Shrimp Canning Processing Waste Water (SPWW)
Influence of Recyclings SPWW on Volume, Soluble Solids and Soluble Protein Product Processing Volumes

| Approximate Total Volume SPWW Used Per Day Gallons | Number of Recycles of SPWW | Approximate Gallons Per Minute of SPWW | Soluble Solids in SPWW | Approximate Gallons Required Volume for pH 4.5 Precipitated Protein Centrifuged Separator Per Day | Approximate Gallons Required for Reverse Osmosis or Ultrafiltration Per Day | Approximate Gallons Required for Spray Drying Soluble Products Per Day (Maximum)** |
|---|---|---|---|---|---|---|
| 192,000* | 0 | 400 | 0.15–0.25 | 20,000 | 180,000 | 18,000 |
| 96,000 | 1 | 200 | 0.29–0.48 | 10,000 | 86,000 | 8,600 |

TABLE I – Continued

Shrimp Canning Processing Waste Water (SPWW)
Influence of Recyclings SPWW on Volume, Soluble Solids and Soluble Protein Product Processing Volumes

| Approximate Total Volume SPWW Used Per Day Gallons | Number of Recycles of SPWW | Approximate Gallons Per Minute of SPWW | Soluble Solids in SPWW | Approximate Gallons Required Volume for pH 4.5 Precipitated Protein Centrifuged Separator Per Day | Approximate Gallons Required for Reverse Osmosis or Ultrafiltration Per Day | Approximate Gallons Required for Spray Drying Soluble Products Per Day (Maximum)** |
|---|---|---|---|---|---|---|
| 48,000 | 2 | 100 | 0.58–0.95 | 5,500 | 33,000 | 3,300 |
| 24,000 | 3 | 50  | 1.0 –1.9  | 3,000 | 21,000 | 2,100 |
| 12,000 | 4 | 25  | 1.9 –3.6  | 1,600 | 10,400 | 1,040 |

*This is for an 8-hour canning day. The average over a 130 day shrimp canning season is frequently lower than this.
**This is for a normal 10-fold concentration of the SPWW non-acid precipitable soluble solids by reverse osmosis or ultrafiltration.

by settling and centrifugation and preferably spray drying. Filtration of the acidified fish cannery waste water supernatant from the acid precipitation of protein components can be best accomplished by passing same through a diatomaceous (silicaceous) filter pad, the surface of which is constantly scarified. A suitable filtration apparatus useful for this purpose is the vacuum, rotary, precoat filter (V.R.P.F.) which continuously scrapes off controlled amounts of the precoat surface during the filtering operation to provide a steady and rapid filtration of the acidified cannery waste water. Filter aids (inerts) such as diatomaceous earth, pearlite, cellulose or the like, which is added to the filtration system, is drawn to the filter surface, such as a screened drum face, to form a cake of the desired thickness, the solids accumulate against the outside surface of this precoat cake. This cake is continuously removed by a knife blade, during operation, to present a continually fresh filtration surface to the aqueous liquid being filtered. Drum vacuum type filters of this character are described in U.S. Pat. No. 3,347,389.

After acidification and precipitation of the protein components of the crustacean cannery recycled waste water, as described, the resultant supernatant aqueous material is subjected to vacuum rotary precoat filtration to provide a clear filtrate having none or a low bacteria count and which filtrate is suitable because it is free of insolubles and large colloidal moieties for reverse osmosis treatment or ultrafiltration to isolate and recover the residual soluble non-acid precipitable proteinaceous components in concentrated form as well as purified water.

Reverse osmosis is a well known membrane separation process, and has hitherto been used for reclaiming potable water from secondary effluent streams. Insofar as known, however, reverse osmosis has not been used heretofore in the treatment of fish or crustacean cannery waste water to recover soluble proteinaceous non-acid precipitable products therefrom in accordance with the present invention. Utilizing reverse osmosis treatment on shellfish cannery recycled or noncycled waste water after acid precipitation of the protein components, two fractions are produced (1) a substantially purified (potable) water fraction by permeation through the membrane, and a stream of reduced volume in which the non-acid precipitable soluble solutes species have been substantially concentrated by the barrier properties of the membrane. For constant osmotic pressure, which is dependent only on the concentration of the solutes, the potable water produced per unit of membrane surface increases with an increase in the applied pressure. By increasing the pressure, more water flows through the membrane while the solutes in concentrated form remains behind.

Reverse osmosis treatment of cannery waste water is exemplified by the following example.

EXAMPLE 1

Shrimp Cannery Noncycled Waste Water Treatment

Approximately 2,000 gallons of once used shrimp processing waste water were collected, after separation of the hulls on a 20 mesh vibrating screen (e.g. Sweco), and pumped into a rubber lined settling tank. The collected waste water was adjusted to pH 4.5 with the addition of, for example, 2 liters of 20° Be muriatic acid. After allowing the crude protein sludge to settle for two hours, the clarified supernatant was then filtered through a 3 feet × 1 inch vacuum rotary precoat filter, as hereinbefore described. This filtration treatment was previously referred to as V.R.P.F. The water clear filtrate from V.R.P.F. was then pumped through a reverse osmosis pressure vessel comprising a semi-permeable membrane, e.g. cellophane, under a pressure averaging 400 lbs./sq. inch (psi) and producing potable water and a brine concentrate containing 2% solids by weight. This brine concentrate was then neutralized with the addition of sodium hydroxide to pH 7.0 and evaporated to dryness in a steam heated stainless steel pan. The resultant composition as concentrated by reverse osmosis contained solids with approximately 62% of amino acids components, the remainder comprising principally sodium chloride (dry weight).

Recycling of the cannery waste water and subsequent treatments as described in Example 1, is exemplified as follows.

EXAMPLE 2

Recycling Shrimp Waste Water

Raw shrimp is fed from a container to the peeling machines. The combined action of the rubber rolls compression and the fresh water jets peels away the hulls or shell portions of the shrimp during the peeling operation leaving the shrimp water soluble components and hulls, as well as some water insoluble shrimp tissues in the waste water. After coarse screening removal of the hulls from the waste water from this hull peeling operation it is collected and passed through a hydrosieve to remove other insolubles which otherwise would clog the jets in the peeling machine and recycled for the peeling operation (4 times) or until waste water comprises about 2 to 3% non-volatile soluble solids by weight. Following the peeling and rinsing operation, the recycled waste water is pumped into a rubber lined settling tank or having a surface not corroded by acid pH 4–5 and adjusted to pH 4.5 (range 4–5) with the addition of, for example, 20° Be muriatic acid. After permitting the crude protein sludge-like material to settle, the supernatant liquid is filtered by V.R.P.F. and the filtrate treated by reverse osmosis as described in Example 1 to recover the soluble components as a concentrate containing 6–11% solids.

EXAMPLE 3

Centrifuge Treatment Recovery of Acid Precipitated Protein Sludge from Waste Water The crude acid precipitated protein sludge, as described in Example 1, was pumped through a superdecantor type centrifuge to give a dewatered sludge containing an average of 10% solids by weight. This dewatered sludge was adjusted to pH 8.5 with caustic soda to extractively solubilize the protein which was then separated by centrifugation giving an effluent which was reprecipitated at pH 4.5 with, for example, 20° Be muriatic acid and recentrifuged to give a tan-reddish cream of crude protein containing 10–20% by weight solids. This cream when dried gave a product containing approximately 55% protein, 30% ether-soluble fatty components, and only 4% chloride as sodium chloride (dry weight). It had a protein equivalent ratio of 123 relative to 100% for casein (Animal Nutrition Research Council Reference Casein). The fatty components had an iodine number of 161 indicating their polyunsaturated nature.

EXAMPLE 4

Ultrafiltration Treatment

The process of Example 1 was repeated except that ultrafiltration members consisting of cellophane membranes of a porosity permitting the passage therethrough of small molecules particularly salt, were used instead of reverse osmosis to treat the pH 4.5 water clear filtrate. This produced a concentrate containing considerably less salt than when reverse osmosis is employed. The lower salt content results from the increased permeability of the filtration member to sodium chloride, thus giving a concentrate containing less salt than in the case where reverse osmosis membranes are utilized. The resultant product has a superior organoleptic properties. A typical composition of the dried low salt product contains approximately 86% (by weight) soluble non-acid precipitable proteinaceous solids material and only about 5% chloride as sodium chloride. Other membranes of predetermined uniform porosity permitting the passage of salt, such as polyamides, or synthetic polymers are available and can be used.

An example of the processing of cannery waste water of crab meat is as follows.

EXAMPLE 5

Ultrafiltration of Acid Precipitated V.R.P.F. Recycled Shrimp Waste Water

Process is like Example 2 using 1,000 gallons shrimp waste water after four recycles except that the V.R.P.F. filtrate from acid precipitation of the protein sludge was passed through an ultrafiltration process using cellophane membranes permeable to sodium chloride. A pressure of 200 lbs. per square inch (psi) was applied and a concentrate containing 6–10% non-volatile solids was obtained. After spray drying, it contained only 4% salt.

EXAMPLE 6

Ultrafiltration of Acid Precipitated Recycled Shrimp Waste Water Without V.R.P.F.

As for Example 5 except that after acid precipitation of three times recycled waste water and acid precipitation of the protein and settling thereof, the clear supernatant therefrom was ultrafiltered without V.R.P.F. to give a concentrate containing 6–10% non-volatile solids and 4.5% salt on the dry basis.

EXAMPLE 7

Crab Processing Waste Water Product Recovery

Raw crabs are chopped or severed into pieces that will provide good size chunks of meat which are placed in a brine solution, e.g. 0.1 N sodium chloride solution, and the mixture transferred to the rotating bowl of a centrifuge which separates the brine and shells. A Bird centrifugal meat extractor, for example, is suitable for this purpose. The sheel portions, which are relatively heavy are thus separated by differences in specific gravity from the meat which is lighter in specific gravity than the shells. During the shell separation, fresh water is used to wash out the brine. The resultant waste water freed of shells is collected and transferred to a settling tank, as described in Example 1, and adjusted to pH 4.5 by the addition of, for example, muriatic acid. After allowing the crude protein sludge to settle, the supernatant material was filtered through a V.R.P.F. and the filtrate treated as in Example 4 to recover a like soluble non-acid precipitable product. The 0.1 N sodium chloride brine may be recycled as depicted for shrimp waste water in Example 5.

In practicing the invention, one skilled in the art can easily ascertain the essential characteristics of this invention, and without departing from the spirit and scope thereof, can make various changes and modifications of the invention to adapt it to various usages and conditions. Substitutions may be made in carrying out the process of the invention e.g. other acids than hydrochloric, such as sulfuric, phosphoric, etc. may be used for acidifying the cannery waste water. Likewise, other semi-permeable membranes than cellophane, such as parchment, or polyamides or other synthetic polymeric membranes may be used in carrying out the reverse osmosis or ultrafiltration treatment of the cannery waste water in accordance with the invention. Such changes and modifications are properly, and intended to be, within the full range of equivalence of the following claims.

What is claimed is:

1. In the canning of crustacean seafood including shrimp which comprises peeling and aqueous washing using water jets to remove the hull or shell portions prior to canning, and the resultant production of cannery waste water, the steps comprising subjecting the resultant washings to screening to remove coarse solids and additionally filtering the washings after the screening operation to remove insolubles which would clog the jets, recycling the filtered washings through the peeling operation for at least two times, acidifying the resultant washings to bring about precipitation of the water soluble protein components, settling the precipitated protein to recover a supernatant liquid, thereafter filtering the supernatant liquid on a precoat vacuum filter, and then subjecting the resultant filtrate to reverse osmosis to recover a protein concentrate and substantially pure water.

2. A cannery process as in claim 1 wherein the cannery waste water is subjected to acidification precipitative removal of proteins and then filtration to give a filtrate suitable for recovery of soluble non-acid precipitable proteinaceous components in concentrated liquid form by ultrafiltration and containing low amounts of sodium chloride.

3. A cannery process as in claim 1, wherein the cannery waste water is recycled at least 5 times through the cannery before treatment of the same to recover valuable components therein.

4. A cannery process as in claim 1 wherein the seafood is shrimp and the water soluble products are isolated by spray drying.

5. A cannery process as in claim 1 wherein the seafood is shrimp and the waste water is subjected to acidification, precipitation of water solubles and ultrafiltration and recovery of a low-salt proteinaceous product.

6. A process as in claim 1 of treating crustacean seafood with aqueous washing process and which includes recycling of the aqueous washing resultant of said treatment, subjecting the processed waste water to ultrafiltration to recover purified water containing salt and water solubles in concentrated solution.

7. A process as in claim 1 wherein the seafood is crab.

* * * * *